UNITED STATES PATENT OFFICE.

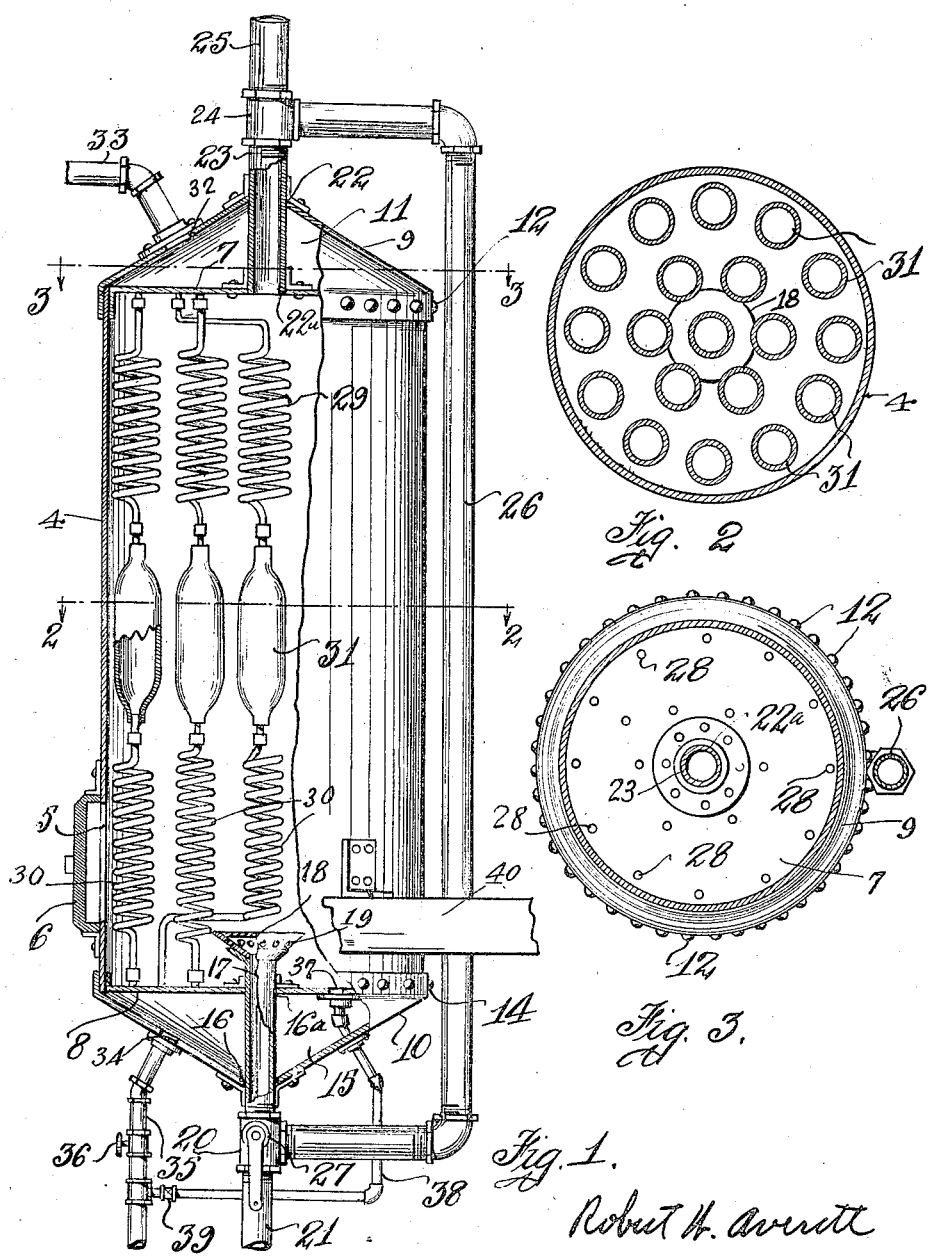

ROBERT W. AVERITT, OF FORT WORTH, TEXAS.

WATER HEATER.

1,422,521. Specification of Letters Patent. Patented July 11, 1922.

Application filed August 9, 1920. Serial No. 402,247.

*To all whom it may concern:*

Be it known that I, ROBERT W. AVERITT, a citizen of the United States, residing at Fort Worth, in the county of Tarrant and State of Texas, have invented certain new and useful Improvements in Water Heaters, of which the following is a specification.

This invention relates to water heaters adaptable to be connected to any steam generating plant and the object of the invention is to provide a means whereby the exhaust while passing through a cylindrical chamber will heat water.

A further object is to provide a novel means inside the cylindrical chamber in which the surface of the water-containing means is made large so as to allow the steam while passing through the cylindrical chamber to get the most effective opportunity to heat the water.

With these and other objects in view, the invention consists in the construction, combination and arrangement of parts as will be hereinafter fully described, illustrated in the accompanying drawings, and pointed out in the claims hereunto appended.

Figure 1 is a view of my invention, part being broken away and part being in section, Fig. 2 is a sectional view on the line 2—2 of Fig. 1, and Fig. 3 is a sectional view on the line 3—3 of Fig. 1.

Referring to the drawings like numerals designate like parts in the various drawings.

4 is a metallic cylinder having an opening at one side as at 5, which opening is provided with a steam-tight door 6. This opening is for use in getting into the metallic cylinder 4 if any of the inner parts hereinafter mentioned are required to be repaired.

The cylinder 4 is provided with a diaphragm 7 across the upper end thereof and a similar diaphragm 8 across the lower end thereof, thus making a closed cylinder.

9 is a conical end attached to the top of the cylinder 4 and extending upwardly therefrom so as to form a water receiving chamber 11 above the top of the diaphragm 7. This end 9 and the diaphragm 7 may be held in proper position by suitable rivets 12.

10 is a conical lower end similar to the end 9 which is positioned below the diaphragm 8 and is attached to the cylinder 4. Suitable rivets 14 may be used in holding the end 10 and the diaphragm 8 securely to the lower end of the cylinder 4. This end 10 provides a hot water chamber 15 which will be hereinafter referred to. The end 10 and the diaphragm 8 are provided with central openings 16 and 16ª respectively to receive a pipe 17, which pipe is provided at its upper end with a conical discharge portion 18 which is provided with suitable openings 19 through which the hereinafter mentioned steam is allowed to exhaust so as to spread through the chamber 4 evenly. The lower end of the pipe 17 is screw-threaded into a T-fitting 20. 21 is a pipe connecting into the T at one end and suitably connected at the other end to the exhaust pipe of any steam generating plant. The end 9 and the diaphragm 7 are provided with central openings 22 and 22ª respectively to receive a pipe 23, which pipe is provided at its upper end with a T-fitting 24. 25 is a suitable pipe extending any suitable distance to provide for carrying off any uncondensed steam. The remaining openings in the T 20 and 24 are directly connected together by a by-pass pipe 26. The T 20 is provided with a three-way valve 27 which operates to allow the steam coming through the pipe 21 to go through the pipe 17 into the cylinder 4, through the pipe 23 and pipe 25, or if the valve 27 is turned in the other direction it will turn the steam coming through the pipe 21 into the by-pass pipe connection 26 and off through the pipe 25 without passing through the cylinder 4. The by-pass is used when it is not desired to heat the water in the water containing means in the cylinder 4.

The diaphragms 7 and 8 are provided with openings 28 which are suitably spaced apart as more particularly illustrated in Fig. 3. Suitably positioned under the diaphragm 7 are top coils 29 which have their upper ends suitably threaded into the openings 28 in the diaphragm 7. Suitably positioned above the diaphragm 8 are lower coils 30 which have their lower ends suitably threaded into the openings 28 in the diaphragm 8. The lower ends of the top coils 29 and the upper ends of the lower coils 30 are suitably engaged in the respective ends of the cylindrical heating chambers 31. It will be noticed that the coils 29 are larger than the coils 30 so that there will always be a full supply in the cylindrical heating chambers 31. That is that the water cannot be drawn off quicker from the cylindrical heating chambers than the incoming quantity.

The end 9 is provided with an opening 32 to receive a water intake connection 33 while the end 10 is provided with an opening 34 to receive a water outlet connection 35. It will be noticed that the intake pipe 33 is larger than the outlet pipe 35 so that there will never be a drawing off of water greater than the amount allowed to pass in through the intake pipe 33. 36 is a control valve on the water outlet connection 35 which by opening will allow the desired amount of water to be drawn off from the hot water chamber 15. I wish to explain here that I do not wish to limit myself to the particular construction illustrated in Fig. 1 as to the hot water chamber, as the end 10 may be of considerable larger size if so desired, so that the hot water chamber may be considerably enlarged from that illustrated in Fig. 1.

It will be found in operation that a certain amount of the steam in the cylinder 4 will become condensed. To allow this condensed steam to pass off I provide an opening 37 in the diaphragm 8 having a suitable pipe connection 38 connected thereto, which pipe connection is connected at its opposite end to the water outlet connection 35. The pipe connection 38 is provided with a check valve 39 so that the water will be allowed to pass only in the direction towards the water outlet control pipe 35.

From the above description, it will be seen that my heater in general consists of a water inlet control pipe bringing water into a top chamber where the water passes through coils and cylindrical heating chambers, which coils and cylindrical heating chambers are positioned in a cylindrical member into which exhaust steam is allowed to pass. The water in going through the coils and cylindrical heating chambers is heated and enters into a hot water chamber at the lower end of the cylindrical chamber 4 from which it may be drawn off as desired. On the other hand if is not desirable to heat the water, I provide a by-pass connection whereby the steam from the exhaust of the generating plant may be allowed to pass off without going through the cylindrical chamber 4.

In Fig. 1 I show a brace 40 suitably connected to the cylinder 4 so as to support the same, but I do not wish to limit myself to this particular supporting means for the cylinder 4 as any other suitable means may be found satisfactory.

From the foregoing it is thought that the construction of my invention will be clearly understood, and, therefore, a more extended explanation has been omitted.

What I claim as new, is,—

1. A water heater consisting of a steam chamber, a water receiving chamber and a hot water holding chamber, coils inside said steam chamber and connected with said water receiving chamber, coils inside said steam chamber and connected with said hot water holding chamber, cylindrical heating chambers inside said steam chamber and connected with and interposed between said coils, a means for supplying steam to said steam chamber, an exhaust outlet from said steam chamber, a water intake connection connected to said receiving chamber and a water outlet connection from said hot water holding chamber, a means for controlling the draw-off through said water outlet connection, a means for allowing the condensed steam in said steam chamber to be drawn off and a supporting means for the said steam chamber.

2. A water heater consisting of a steam chamber, a water receiving chamber and a hot water holding chamber, coils inside said steam chamber and connected with said water receiving chamber, coils inside said steam chamber and connected with said hot water holding chamber, cylindrical heating chambers inside said steam chamber and connected with and interposed between said coils, a means for supplying steam to said steam chamber, an exhaust outlet from said steam chamber, a control means on said means for supplying steam to said steam chamber and a by-pass connection between said means and said exhaust, a water intake connection connected to said receiving chamber and a water outlet connection from said hot water holding chamber, a means for controlling the draw-off through said water outlet connection, a means for allowing the condensed steam in said steam chamber to be drawn off and a supporting means for the said steam chamber.

3. A water heater comprising a steam chamber, a water-receiving chamber, a hot water holding chamber, coils inside said steam chamber and connected with the water-receiving chamber, coils in the steam chamber connected with the hot water holding chamber, heating chambers interposed between and connected with said coils, the coils connecting the water-receiving chamber with the said heating chambers being of greater capacity than the other coils, and water inlet and outlet means, and means for drawing off the water of condensation.

In testimony whereof I affix my signature in the presence of two witnesses.

ROBERT W. AVERITT.

Witnesses:
W. A. STRIPLING,
W. C. LIPFORD.